US009686737B2

(12) United States Patent
Ljung

(10) Patent No.: US 9,686,737 B2
(45) Date of Patent: Jun. 20, 2017

(54) METHOD FOR OPERATING A MOBILE DEVICE

(71) Applicant: Sony Mobile Communications AB, Lund (SE)

(72) Inventor: Rickard Ljung, Helsingborg (SE)

(73) Assignees: Sony Corporation, Tokyo (JP); Sony Mobile Communications Inc, Tokyo (JP)

( * ) Notice: Subject to any disclaimer, the term of this patent is extended or adjusted under 35 U.S.C. 154(b) by 0 days.

(21) Appl. No.: 14/762,248

(22) PCT Filed: Jan. 20, 2014

(86) PCT No.: PCT/EP2014/050994
§ 371 (c)(1),
(2) Date: Jul. 21, 2015

(87) PCT Pub. No.: WO2014/111556
PCT Pub. Date: Jul. 24, 2014

(65) Prior Publication Data
US 2015/0365884 A1 Dec. 17, 2015

(30) Foreign Application Priority Data
Jan. 21, 2013 (EP) .................................... 13000296

(51) Int. Cl.
*H04W 36/00* (2009.01)
*H04W 48/16* (2009.01)
(Continued)

(52) U.S. Cl.
CPC ........... *H04W 48/16* (2013.01); *H04W 36/14* (2013.01); *H04W 48/18* (2013.01); *H04W 48/04* (2013.01)

(58) Field of Classification Search
CPC ...... H04W 48/16; H04W 36/14; H04W 48/18
(Continued)

(56) References Cited

U.S. PATENT DOCUMENTS

2008/0107051 A1 5/2008 Chen
2009/0163195 A1 6/2009 Kim et al.
(Continued)

FOREIGN PATENT DOCUMENTS

| EP | 2 046 078 | 4/2009 |
|---|---|---|
| WO | 2004/008793 | 1/2004 |
| WO | 2010/010009 | 1/2010 |

OTHER PUBLICATIONS

International Search Report and Written Opinion dated May 22, 2014 for corresponding International application No. PCT/EP2014/050994.

*Primary Examiner* — Tanmay Shah
(74) *Attorney, Agent, or Firm* — Renner, Otto, Boisselle & Sklar, LLP

(57) ABSTRACT

The present invention relates to a method for operating a mobile device comprising a first interface unit for selectively interfacing to at least one communication network of a group of communication networks depending on a network selection information, and a second interface unit for interfacing to a communication device providing network information relating to a communication network related to the communication device. According to the method, the network information related to the communication network related to the communication device is received from the communication device. The network selection information is modified based on the received network information and a communication network is selected from the group of communication networks depending on the modified network selection information.

13 Claims, 2 Drawing Sheets

(51) Int. Cl.
   *H04W 48/18* (2009.01)
   *H04W 36/14* (2009.01)
   *H04W 48/04* (2009.01)
(58) Field of Classification Search
   USPC .......................................................... 455/436
   See application file for complete search history.

(56) References Cited

U.S. PATENT DOCUMENTS

| | | | |
|---|---|---|---|
| 2012/0190353 A1* | 7/2012 | Harwell | H04W 4/02 455/422.1 |
| 2013/0005391 A1 | 1/2013 | Niass et al. | |
| 2013/0145346 A1* | 6/2013 | Liu | G06F 8/51 717/113 |

* cited by examiner

METHOD FOR OPERATING A MOBILE DEVICE

FIELD OF THE INVENTION

The present invention relates to a method for operating a mobile device, especially to a method for selecting a wireless communication network from a plurality of communication networks for a mobile device, for example a cellular phone. The present invention relates furthermore to a mobile device and a communication device implementing the method for operating the mobile device.

BACKGROUND OF THE INVENTION

In current infrastructures there are many different possibilities for mobile devices, for example mobile cellular phones or so called smart phones, to gain access to a wireless communication network. For example, when a user of a mobile device is walking down a main street of a larger city center, it is likely that there will be coverage from several wide area cellular networks of the second, third or fourth generation (2G, 3G or 4G). Additionally, there will also be a number of different small cells for wireless access utilizing for example wireless local area network standards (LAN 802.11) or other small cell technologies. Due to the variety of different available wireless cellular or local area networks, it may complicated to select an appropriate network, since the optimal network selection may be different for different users based on for example different priorities on charging, data rate expectations and so on. Various solutions for optimizing network selection are available, for example based on standardized solutions in 3GPP (third generation partnership project), for example the so called access network discovery and selection function (ANDSF) providing the possibility to control general network selection policies. Another solution is based on the so called Hot Spot 2.0 technology, where the mobile device or mobile terminal and its network selection managing function can get information on available 802.11 networks prior to selection.

However, the above-described solutions for network selection may not work appropriately when one or more base stations or access points are enabling networks for one or more mobile devices or terminals, but the base stations or access points are not always suitable to connect with, as will be shown in the following example. For example, some of the base stations or access points may be within movement compared to others. FIG. 1 shows a first base station 5 and its associated first cell 1, and a second base station 6 and its associated second cell 2. Furthermore, FIG. 1 shows a first moving cell 3 moving with a first vehicle 7 and a second moving cell 4 moving with a second vehicle 8. The first vehicle 7 is moving in the direction of arrow 9 and the second vehicle 8 is moving in the direction of arrow 10. Typical scenarios in this cell base communication network could be that a first user using mobile device 11 is walking down a street in a city where several vehicles 7, 8, for example vehicles of a public transportation like buses or trains, are passing in close proximity. These vehicles have their own small cells 3, 4 available. Another second user may be located within a moving vehicle, for example within vehicle 7, using a second mobile device 12. For mobile device 11, the most suitable cell to register at is cell 2 even when cell 4 is available while vehicle 8 is passing along the mobile device 11. For mobile device 12 the moving cell 3 provided by vehicle 7 is the most suitable cell to register at even when cells 1 or 2 are available during traveling.

However, currently available solutions for network selection cannot distinguish the above-described different user scenarios and cannot know the full context defining if it is suitable to connect to a certain network or not. In practice this could mean that neither the network nor the mobile device can control its network selection based on whether the mobile device is located within a moving vehicle or at a sidewalk with a moving vehicle just close by.

Therefore, it is an object of the present invention to provide a network selection mechanism which solves the above-described problem.

SUMMARY OF THE INVENTION

According to the present invention, this object is achieved by a method for operating a mobile device as defined in claim 1 and a mobile device as defined in claim 11. The dependent claims define preferred and advantageous embodiments of the invention.

According to an aspect of the present invention, a method for operating a mobile device is provided. The mobile device comprises a first interface unit for selectively interfacing to at least one communication network of a group of communication networks. The mobile device comprises a second interface unit for interfacing to a communication device which provides a network information relating to a communication network which is related to the communication device. The selection to which communication network the first interface unit is interfacing, is based on a network selection information. Interfacing to a communication network may comprise for example that the mobile device registers at the selected communication network. The network selection information may be provided by the mobile device and may comprise information about each communication network of the group of communication networks, for example access information for gaining access to the communication network and the priority information defining a priority for selecting a communication network from the group of communication networks. Thus, the network selection information provides a policy for selecting a most appropriate communication network from the group of communication networks and furthermore a policy which communication network is to be interfaced, if the most appropriate network cannot be reached. The communication device is a device which is related to a base station or an access point and provides network information relating to the communication network or a communication cell which is provided by the associated base station or access point. Thus, the communication device is related to a communication network or a cell of a communication network and provides the corresponding network information. The network information may comprise among other things for example access information for gaining access to the communication network related to the communication device. According to the method, the network information related to the communication network which is related to the communication device is received from the communication device. Based on the received network information the network selection information is modified. Modifying the network selection information may comprise for example adding the communication network related to the communication device to the group of communication networks. Furthermore, modifying the network selection information based on the received network information may comprise for example updating access information for gaining access to the communication network, if the communication network related to the communication device is already present in the group of communication networks. Depending on the modified network selection information a communication network from the group of communication networks is selected.

By using the above-described method the network selection information can be dynamically adapted based on whether the mobile device is moving along with the communication network in movement or not. In practice, this means that the network selection information is modified when the mobile device is entering a vehicle such that the communication network provided by the vehicle is preferred, whereas a stationary communication network is preferred when the mobile device is outside the vehicle.

According to an embodiment, the network selection information comprises a priority assignment which assigns to each of the plurality of communication networks a corresponding priority. A communication network for interfacing is selected from the group of communication networks depending on the priority assignment.

According to a further embodiment, an initial priority is assigned to the communication network which is related to the communication device. The initial priority is based on the received network information. The assignment of the initial priority to the communication network is performed upon receiving the network information from the communication device. For example, when the mobile device is moved into a vehicle, it may receive from a communication device provided in the vehicle via the second interface unit a network information concerning a communication network provided in the vehicle. The network information comprises an initial priority for the communication network provided in the vehicle and the initial priority may have a high or highest priority value. Thus, the mobile device tries to select the communication network provided in the vehicle.

In addition to the initial priority, the network information may comprise for example access information for gaining access to the communication network related to the communication device, cost for using the communication network related to the communication device, and/or an available data rate of the communication network related to the communication device. By providing the access information, the mobile device can automatically register to the communication network related to the communication device without further user interaction. Thus, a seamless switching from one communication network to another communication network is enabled. Furthermore, the mobile device may compare the cost for using the communication network related to the communication device with cost for using other available communication networks and may select the network with the lowest cost. Moreover, the mobile device may determine a currently required data rate for applications running on the mobile device and may compare this required data rate with the available data rate of the communication network related to the communication device. Based on the comparison the communication network related to the communication device may be selected or not.

According to an embodiment, a distance between a position of the mobile device and a position of a base station or access point, which is related to the communication network related to the communication device, is determined. A lower priority than the initial priority is assigned to the communication network, which is related to the communication device, depending on the distance. As described above, when a mobile device is traveling along with a vehicle providing a communication network, the priority of the communication network of the vehicle may be increased or set to a high value by receiving the network information from the communication device of the vehicle. When the mobile device is departing from the vehicle, the distance between the position of the mobile device and the position of the base station moving along with the vehicle is increasing. When the distance exceeds a predetermined distance, the priority of the communication network related to the vehicle may be lowered thus facilitating the mobile device to register to another more appropriate communication network than the communication network provided by the vehicle.

According to another embodiment, a further network information relating to a further communication network related to a further communication device is received from the further communication device via the second interface unit. Upon this reception of the further network information, a lower priority than the initial priority is assigned to the communication network which is related to the communication device. Thus, when the mobile device is moving from one vehicle to another vehicle or is moving from one vehicle to an area where a local area network is provided, the priority of the communication network of the one vehicle is lowered thus facilitating the mobile device to easily register to another communication network which may be more appropriate. In other words, the network selection information is updated automatically when the mobile device is moving from one area providing a preferred communication network to another area providing another preferred communication network.

The communication network related to the communication device may comprise a cellular telecommunication network or a wireless local area network. The second interface unit may provide a wireless short range radio frequency communication having a transmission range of less than 100 m, preferably less than 10 cm. For example, the second interface unit may provide a near field communication (NFC) in the range of a few centimeters or a Bluetooth communication with a transmission range of less than 100 m. The short range communication provides information to modify the network selection information and enables thus the above-described dynamic network selection. Furthermore, the short range communication may provide information to enable a communication network authentication. For example, when a user is entering a building providing a local area network or when the user is entering a public transportation providing a local area network, update information and access information for registering at the local area network may be communicated via the short range communication.

According to an embodiment, the authentication information may be provided in response to a billing via the short range communication. For example, when a user is buying a ticket for a public transportation and pays the ticket electronically with the mobile device via the short range communication, the mobile device may receive authentication information for gaining access to a local area network provided in the public transportation.

According to another aspect of the present invention, a mobile device is provided comprising a first interface unit, a second interface unit and a processing unit. The first interface unit is configured to selectively interface to at least one communication network of a group of communication networks. The selection which communication network of the group of communication networks is interfaced by the first interface unit depends on a network selection information. The network selection information may be provided for example by the processing unit of the mobile device. Interfacing to a communication network may comprise for example registering the mobile device for a communication at the communication network. The second interface unit is configured for interfacing to a communication device providing network information relating to a communication network which is related to the communication device. For example, the communication device may comprise a base station or may be related to a base station of a communication network which is available in the area around the communication device. The processing unit is configured to receive the network information from the communication device, and to modify the network selection information based on the received network information. Then, the processing unit selects a communication network from the group of communication networks depending on the modified network selection information.

According to an embodiment, the mobile device is configured to perform the method steps of the embodiments of the above-described method. Furthermore, the mobile device may comprise for example a mobile phone, a personal digital assistant, a mobile music player, a tablet computer, a laptop computer, a notebook computer, and a navigation system.

According to another aspect of the present invention, a communication device comprising an interface unit for wirelessly interfacing to a mobile device, and a processing unit is provided. The processing unit is configured to provide network information relating to a communication network which is related to the communication device via the interface unit. Furthermore, the communication device is configured to perform the method steps of the above-described method or embodiments thereof.

Finally, according to another aspect of the present invention, a combination of a mobile device as defined above and a communication device as defined above is provided.

Although specific features described in the above summary and in the following detailed description are described in connection with specific embodiments and aspects, it is to be understood that the features of the embodiments and aspects may be combined with each other unless specifically noted otherwise.

BRIEF DESCRIPTION OF THE DRAWINGS

The invention will now be described in more detail with reference to the accompanying drawings.

DETAILED DESCRIPTION OF PREFERRED EMBODIMENTS

In the following, exemplary embodiments of the invention will be described in more detail. It has to be understood that the features of the various exemplary embodiments described herein may be combined with each other unless specifically noted otherwise.

Figure 2:
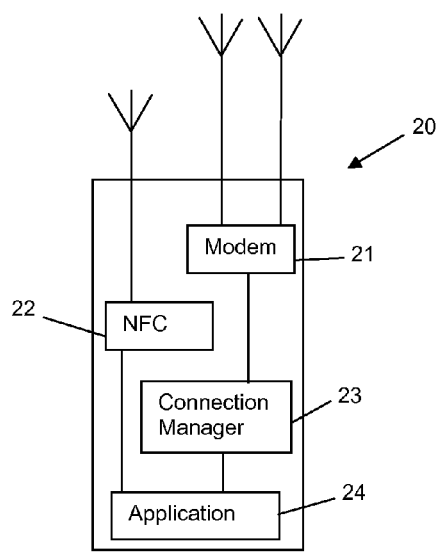
FIG. 2 shows schematically a mobile device according to an embodiment of the present invention.

FIG. 2 shows schematically a mobile device 20, for example a mobile phone, especially a so called smart phone. The mobile device comprises a first interface unit 21 for selectively interfacing to a communication network, for example a cellular communication network like GSM, UMTS or LTE or any other kind of cellular communication network, and for interfacing to wireless local area networks, for example local area networks according to 802.11. The first interface unit 21 is also called modem 21. The mobile device 20 comprises furthermore a second interface unit 22 providing a wireless short range data communication according for example a Near Field Communication standard (NFC) or a Bluetooth standard. The mobile device 20 comprises furthermore a connection manager 23 which is controlled by an application 24 of the mobile device 20. The application 24 may be performed by a processing unit (not shown) of the mobile device 20. The application 24 may provide a network selection information, a so called network selection policy, for selecting a communication network from a plurality of communication networks available to the mobile device 20. The application 24 provides the network selection information to the connection manager 23 which controls the modem 21 such that the selected communication network is used for data communication. The application 24 receives via the second interface unit 22 network information from a communication device. The network information relates to a communication network which is provided by the communication device or which is related to the communication device. The network information may comprise for example a priority for selecting the communication network related to the communication device and access information for gaining access to the communication network. Based on the network information received via the second interface unit 22, the application 24 modifies the network selection information and thus the connection manager 23 selects a communication network from the available communication networks depending on the modified network selection information.

Figure 1:
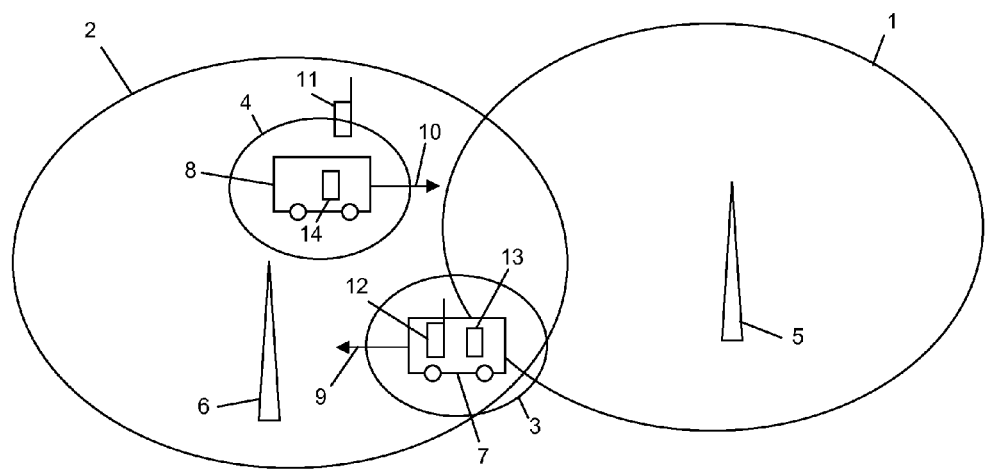
FIG. 1 shows schematically a scenario of mobile devices in an area where different communication networks or cells of communication networks are provided.
Figure 3:
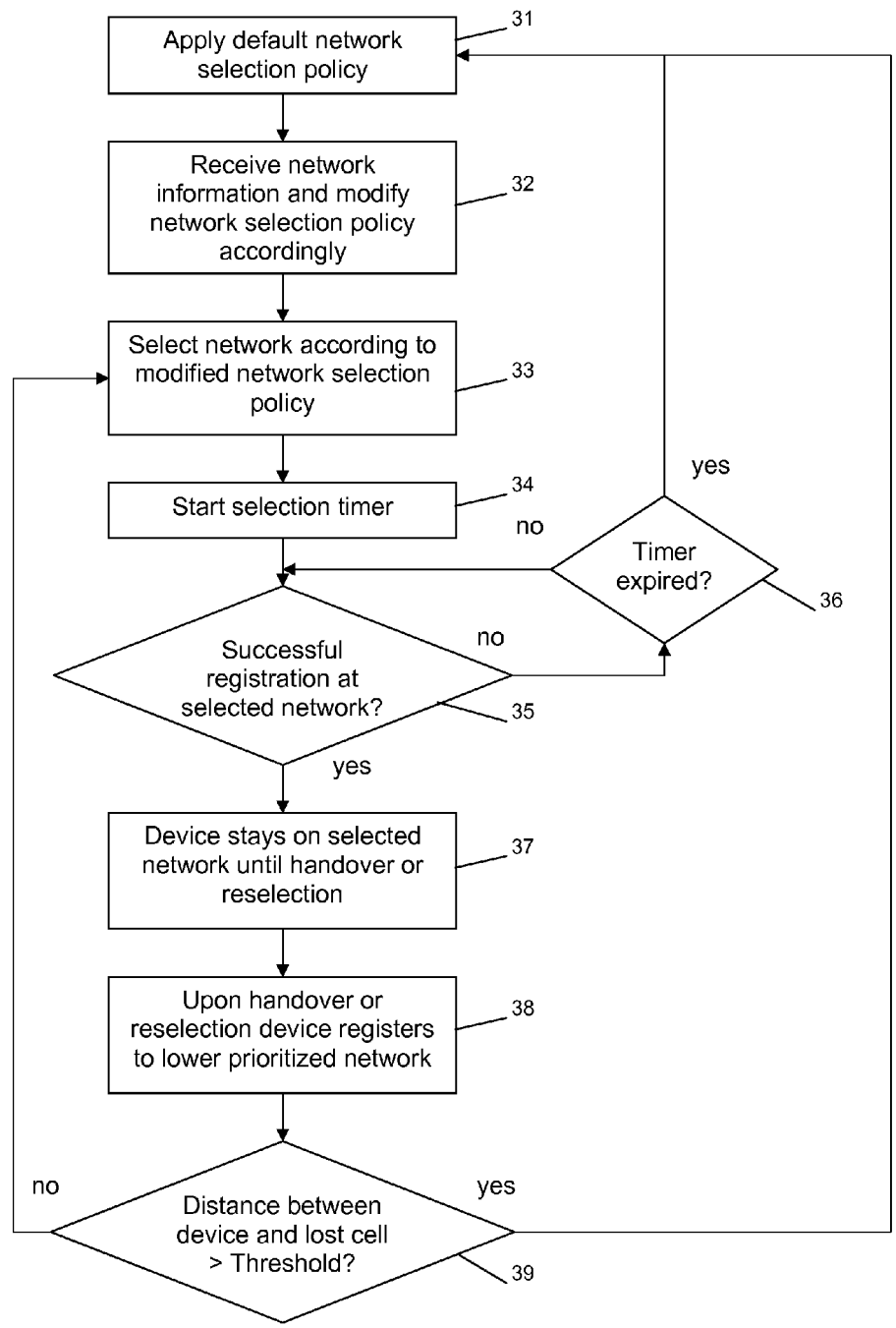
FIG. 3 shows method steps according to an embodiment of the present invention.

FIG. 3 shows the operation of the mobile device 20 in more detail. In step 31 a default network selection policy is applied by the application 24 to select a communication network from a plurality of available communication networks. The network selection policy may comprise for example priorities as well as cost and/or an available data rate for selecting one of the communication networks. With respect to the FIG. 1 and as an example only, the mobile device 11 may select either network 2 or network 4, and the mobile device 12 may select either network 2 or network 3 depending on cost, required data rate and priority. For example, in the default network selection policy, the stationary communication network 2 may have a higher priority than the mobile communication networks 3 and 4. Thus, using the default network selection policy, both mobile devices 11 and 12 may select the communication network 2 for communication. When mobile device 12 is entering the vehicle 7, it receives from a communication device 13 provided in the vehicle 7 a network information concerning the communication network 3. This network information is received via the near field communication interface unit 22. The application 24 modifies the network selection policy accordingly which means that the communication network 3, which may comprise for example a local area network of the vehicle 7, gets a higher priority than the communication network 2 (step 32). Since the mobile device 11 is not entering the vehicle 8, it does not receive additional network information from a communication device 14 provided in the vehicle 8 and continues therefore using communication network 2 for communication although the communication network 4 is available. Returning to mobile device 12, the connection manager 23 uses the modified network selection policy and tries to select the communication network 3 (step 33). Selecting the communication network 3 may comprise for example registering at the communication network 3 using authentication information received via the near field communication interface unit 22 from the communication device 13 of the vehicle 7. Additionally, in step 34, a timer is started. In step 35 the application 24 checks, if the registration at the communication network 3 was successful. If the registration was not successful, further registration attempts are performed until in step 36 the timer is expired. The timer may be set to a few hundred milliseconds or a few seconds. When the timer is expired, the process returns to step 31 where the default selection network policy is applied and the connection manager 23 tries to connect to communication network 2 due to the higher priority of communication network 2 in the default network selection policy. When in step 35 it is determined that the mobile device 12 has successfully registered at the communication network 3, the device 12 stays on the selected communication network 3 until a handover to another communication network or a trigger for a network reselection occurs in step 37. In step 38, upon a handover or a reselection, the mobile device 12 registers to a lower prioritized network, for example to communication network 2. The handover or the reselection may be trigger because of a lost connection to the communication network 3. Therefore, in step 39 a distance between the mobile device 12 and the lost communication network 3 is determined and compared to a predetermined threshold. The position of the communication network 3, for example a geographic position of a center of the communication network 3 or a position of a base station or an access point relating to the communication network 3, may be communicated to the mobile device 12 via the lower prioritized network 2. If the distance is larger than the threshold, the method continues in step 31 with applying the default network selection policy, or as an alternative, with lowering the priority of the communication network 3. When the distance is larger than the threshold this is an indicator that the mobile device 12 has left or is leaving the area of the communication network 3, for example because the user using the mobile device 12 is leaving the vehicle 7. When the distance between the mobile device 12 and the communication network 3 is lower than the threshold, the method continues in step 33 and tries to reselect the communication network 3.

To sum up, with the above-described method, a network selection of the mobile device 11 or 12 works in the following way: the mobile device does not try to access a communication network, if the communication network is related to a vehicle just shortly passing by in the proximity. The mobile device connects to a vehicle based communication network, when the user using the mobile device is entering the vehicle. The mobile device prioritizes to use the vehicle based communication network as long as the mobile device is within the vehicle even if another available network is becoming available in its proximity.

The above-described method is for example suitable for network selection policy modifications when a user is entering a public transport and is using a mobile device with Near Field Communication (NFC) for example for ticket charging. During the ticket charging the vehicle based Near Field Communication unit may also transmit an instruction to the connection manager. This may be done automatically without any additional user interaction.

When the user is leaving the specific moving communication network this could be triggered in different ways. For example the connection manager policy is updated when locations or positions of the mobile device and the network base station differ more than a predefined value. Furthermore, the connection manger policy may be updated by specific triggering, for example from a new near field communication control signaling when leaving the vehicle or from a user interface triggered by the user.

When the mobile device is no longer within the range of the moving communication network 3, it will connect to another network, for example the communication network 2. In order to confirm that the mobile device is no longer in proximity of the moving communication network 3, the mobile device 12 can via data transferred from a central server receive the current position of the network base station of the communication network 3 it has been attached to. The mobile device 12 then compares this position with its own position and therefore automatically confirms that the moving communication network 3 is no longer applicable and update the connection manager policy accordingly. For realizing this, an additionally signaling message from the communication network 2 to the mobile device 12 may be required after a connection establishment. This could be realized by an appropriate addition to the corresponding communication standards, for example to a 3GPP standard, if applying this method to for example WCDMA or LTE technologies.

The above-described method provides a possibility to dynamically control connection manager policies to ensure that a mobile device selects a most suitable network, for example a wireless access network, also when entering and leaving moving communication networks. This may avoid that the mobile device attaches to small cell networks on vehicles just passing by in their proximity.

While exemplary embodiments have been described above, various modifications may be implemented in other embodiments. For example, the wireless local area network may be provided in a building and the mobile device 20 may receive the network information concerning the local area network in the building via a communication device located at an entrance of the building. Thus, when entering the building, the network information is provided to the mobile device 20 via the Near Field Communication interface unit 22 when entering the building. When leaving the building, an additional network information for resetting the connection manager to the default network selection policy or for lowering the priority of the communication network provided in the building may be provided via a further network information provided via interface unit 22.

The invention claimed is:

1. A method for operating a mobile device, comprising the steps of:
    receiving, at the mobile device via a second interface unit of the mobile device from a communication device, network information related to the communication network related to the communication device, wherein the second interface unit is operative to interface to the communication device that provides the network information relating to the communication network related to the communication device,
    changing in the mobile device the network selection information based on the received network information,
    selecting by the mobile device a communication network from the group of communication networks depending on the changed network selection information, and
    interfacing the mobile device with the selected communication network via a first interface unit of the mobile device, the first interface unit being different from the second interface unit and operative to selectively interface to at least one communication network of the group of communication networks depending on the network selection information.

2. The method according to claim 1, wherein the network selection information comprises a priority assignment assigning to each of the plurality of communication networks a corresponding priority, wherein the step of selecting comprises selecting a communication network from the group of communication networks depending on the priority assignment.

3. The method according to claim 2, further comprising upon receiving from the communication device the network information related to the communication network related to the communication device:
    assigning to the communication network, which is related to the communication device, an initial priority based on the received network information.

4. The method according to claim 3, wherein the network information comprises at least one of the group comprising:
    the initial priority,
    access information for gaining access to the communication network related to the communication device,
    cost for using the communication network related to the communication device, and
    an available data rate of the communication network related to the communication device.

5. The method according to claim 3, further comprising:
    determining a distance between a position of the mobile device and a position of a base station related to the communication network related to the communication device, and
    assigning to the communication network, which is related to the communication device, a lower priority than the initial priority depending on the distance.

6. The method according to claim 3, further comprising:
    receiving, via the second interface unit, from another communication device another network information relating to another communication network related to the another communication device, and
    upon receiving the another network information:
        assigning to the communication network, which is related to the communication device, a lower priority than the initial priority.

7. The method according to claim 3, further comprising, if the selected communication network is the communication network related to the communication device:
    trying to gain access to the selected communication network, and if the selected communication network could not be accessed within a predetermined time period:
    assigning to the communication network, which is related to the communication device, a lower priority than the initial priority.

8. The method according to claim 1, wherein the communication network related to the communication device comprises a cellular telecommunication network or a wireless local area network.

9. The method according to claim 1, wherein the second interface unit provides a wireless short range radio frequency communication having a transmission range of less than 100 m, preferably less than 10 cm.

10. The method according to claim 9, wherein the short range radio frequency communication comprises a Near Field Communication NFC or a Bluetooth communication.

11. A mobile device, comprising:
    a first interface unit for selectively interfacing to at least one communication network of a group of communication networks depending a network selection information,
    a second interface unit for interfacing to a communication device providing network information relating to a communication network related to the communication device, the second interface unit being different from the first interface unit, and
    a processing unit configured to receive via the second interface unit from the communication device the network information related to the communication network related to the communication device, to change the network selection information based on the received network information, to select a communication network from the group of communication networks depending on the changed network selection information, and to interface with the selected communication network via the first interface unit.

12. The mobile device according to claim 11, wherein the mobile device is configured to perform the method according to claim 1.

13. The mobile device according to claim 11, wherein the mobile device comprises at least one device of a group consisting of a mobile phone, a personal digital assistant, a mobile music player, a tablet computer, a laptop computer, a notebook computer, and a navigation system.

* * * * *